3,769,334
DERIVATIVES OF AMINO DIALKANOIC ACIDS
Aldo Garzia, Lodi, Italy, assignors to Instituto Chemioterapico Italiano S.p.A., Milan, Italy
No Drawing. Filed June 26, 1970, Ser. No. 50,326
Int. Cl. C07c 103/30
U.S. Cl. 260—519
8 Claims

ABSTRACT OF THE DISCLOSURE (3,4,5-trialkoxybenzoyl) amino dialkanoic acids and their pharmaceutically-acceptable salts for prophylaxis and treatment of cardiac disorders.

BACKGROUND OF THE INVENTION

This invention relates to a method of prophylaxis and treatment of cardiac disorders. In a particular aspect, it relates to a method of treating ischemic cardiopathy prior to or following cardiac infarction, disorders of rhythm, and disorders of stimulus transmission by the administration of an amino dialkanoic acid derivative.

The prevention and treatment of cardiac disorders, such as ischemia, thrombosis, cardiac infarction and disorders of rhythm and stimulus transmission, is a serious problem. Many studies have been conducted in an effort to ascertain the underlying causes and to develop a suitable method of preventing or treating these serious problems, particularly cardiac insufficiency and cardiac infarction. The pharmacological methods which have been proposed for preventing cardiac infarction include lowering of blood cholesterol levels, relaxation of the arteries and administration of anticoagulants. Ventricular fibrillation is a highly dangerous condition which is treated by electric shock administered to the heart muscle, and other rhythm and transmission disorders respond to installation of the "pacemaker" device.

While the use of these methods has greatly improved the prognosis of cardiac patients, the problem of cardiac disorders generally still remains a severe one and in particular the problems caused by infarction are still grave.

SUMMARY OF THE INVENTION

It is an object of this invention to provide a method of prophylaxis and treatment of cardiac disorders.

It is another object of this invention to provide novel pharmaceutical compositions suitable for the prophylaxis and treatment of cardiac disorders.

Another object of this invention is to provide a method of prophylaxis and prevention of ischemic cardiopathy, cardiac infarction and disorders of rhythm and stimulus transmission by the administration of derivatives of amino dialkanoic acids.

Other objects of this invention will be readily apparent to those skilled in the art from the disclosure herein.

It has been discovered that administration of compounds corresponding to the following formula

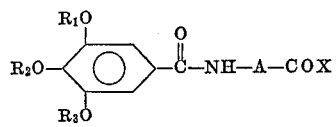

where each of $R_1$, $R_2$ and $R_3$ is methyl, ethyl or propyl, A is a saturated aliphatic hydrocarbon radical containing 2–8 carbon atoms substituted with one carboxylic acid groups, and X is —OH, —$NH_2$ or —$OR_4$ where $R_4$ is lower alkyl, or their pharmaceutically-acceptable salts, is effective in the prophylaxis and treatment of cardiac disorders such as cardiac ischemia and infarction, disorders of rhythm and disorders of stimulus transmission. The compound is administered at a dosage of 2–8 grams per day per average 60–70 kg. individual. When administration is by intravenous or intraperitoneal injection, soluble, pharmaceutically acceptable salts of the compounds of this invention are preferred.

DETAILED DISCUSSION

The compounds of the present invention are prepared by reacting 3,4,5-trialkoxybenzoyl chloride with the corresponding amino dialkanoic acid or its hydrochloride at a temperature of about 0° to 15° C. According to the process of this invention, the free amino acid or its hydrochloride is slurried or dissolved in water and is neutralized with a sodium hydroxide solution. The mixture is chilled to within 0 to 15° C., 3,4,5-trialkoxybenzoyl chloride is gradually added with agitation, and the reaction mixture is stirred at room temperature for from 10 to 15 hours. The mole ratio of amino acid to the benzoyl chloride is generally about 1–1.5:1. Water is added to the resulting solution and it is acidified with dilute HCl or $H_2SO_4$ to a pH of about 3 at which point a precipitate forms. The precipitate is filtered and washed with water until the wash water is neutral, then dried.

According to the method of the present invention, compounds corresponding to the formula given hereinbefore are administered for the treatment of cardiac ischemia, either prior to or following a cardiac infarction, disorders of the rhythm whether related to the infarction or not, and disorders of stimulus transmission. Administration of these compounds in an effective prophylaxis in cases of an impending cardiac infarction and an effective treatment after infarction has occurred. According to one embodiment of the present invention, the method is employed in veterinary medicine, principally in the treatment of household pets, especially dogs, where cardiac problems are frequently encountered.

Cardiac infarction frequently occurs without prior symptoms or before the patient has sought treatment for the relief of symptoms. However physicians are frequently able to detect symptoms of an approaching crisis and the administration of the compounds of this invention can be started promptly to obtain prophylactic effects.

The products of the present invention are of a low-order of toxicity and no side effects are observed in clinical trials. Pharmacological studies indicate that the principal effect of the compounds of the invention is on the heart. The only observed effect on the circulatory system is an increase in the static blood pressure with no significant change in mean arterial pressure.

The dosage in which the compounds of the present invention can be given can vary widely within rather broad limits. Good results have been obtained with as little as 25 mg./kg./day and as much as 500 mg./kg./day. In human clinical cases, all of the disorders cited above generally respond to a dosage of 2–8 grams per day per person, preferably about 6 grams per day. This dosage is intended for an average 60–70 kg. individual equivalent to a dosage generally within the range of about 25–200 mg./kg./day. A dosage in the range of about 40–100 mg./kg./day is preferred. The treatment can consist of a single daily dose, or the above dosages can be given fractionally at periodic intervals. A single daily dose is generally preferred for a treatment of cardiac infarction and associated disorders but for prophylaxis, smaller periodic doses, e.g. a 500 mg. dose, 6 times daily, is preferred.

Administration of the compounds of this invention can be oral, subcutaneous, intravenous or intraperitoneal. When the compounds of the present invention are by subcutaneous, intraperitoneal or intravenous injection, they are administered as their water-soluble neutral salts. Any soluble, pharmaceutically-acceptable salt is suitable and the sodium and potassium salts are preferred. The sodium salt is particularly preferred. For oral administration the compounds are preferably administered as the free acids but they can also be pharmaceutically-acceptable salts, e.g. as the ammonium, sodium, potassium, magnesium or calcium salt. According to one suitable method, the free acids can be administered mixed with a molar equivalent of sodium or potassium bicarbonate. In the examples, the compounds were administered intraperitoneally as the sodium salt because of its ease of handling as an aqueous solution, but the weights given are for the free acid. When administered orally, the compounds are conveniently administered as tablets containing 500 mg. with a suitable binder, many of which are known.

Suitable tablets for human or animal use can conveniently be prepared containing 50–500 mg. of the compounds of the present invention, either as the free acid or as a pharmaceutically-acceptable salt thereof. Tablets containing as little as 50 mg. are suitable for oral administration, especially for infants and small children, and in veterinary medicine, for small animals. Tablets containing less than 50 mg. can be prepared, and in special cases may be useful, but generally a dose smaller than 50 mg. is too small to be practical because in the average patient the number of tablets required per day would be excessively high for convenience. Tablets containing more than 500 mg. can also be prepared, but large tablets are difficult for most patients to swallow.

EXAMPLE 1

L.-glutamic acid hydrochloride, 18.3 grams (0.1 mole) was dissolved in 12 ml. of water and neutralized with 8 grams (0.2 mole) of a 50% aqueous solution of sodium hydroxide. To this solution was added 120 ml. (0.3 mole) of a 10% aqeuous solution of sodium hydroxide and the resulting admixture was chilled and maintained at 8–10° C. during the addition of 20.7 grams (0.09 mole) of 3,4,5-trimethoxybonzoyl chloride with stirring. The reaction mixture was stirred for 12 hours at room temperature.

The reaction mixture was diluted with 200 ml. of water and acidified to a pH of 3 with dilute hydrochloric acid.

The resulting light precipitate was filtered to give a white product which was washed with water until the wash water was neutral. The washed product was dried in air and recrystallized three times. The dry product weighed 23 grams and had a melting point of 106°–108° C. The yield was 75%.

The product is N-(3,4,5-trimethoxybenzoyl)-L-glutamic acid having the structure

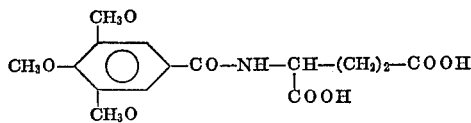

The oral toxicity was evaluated by converting the free acid of the sodium salt and administering to female rats weighing approximately 100 g. by intraperitoneal administration the $LD_{50}$ was 7400 mg./kg. which is more than 70 times the average contemplated daily dose.

EXAMPLE 2

The effect of the compound prepared according to the procedure of Example 1 on the heart is determined in rats by intraveous injection of 1 unit per kilogram of vasopressin (Pitressin, marketed by Parke, Davis Co.), an antidiuretic pituitary hormone. As is known, the administration of vasopressin results in variations of the voltage and the morphology, or shape, of the T-wave. It also causes arrhythmia and produces ischemia of the myocardium. It is determined that these electrocardiographic alterations normally produced by the administration of Pitressin are reduced by the administration of the compound of Example 1.

EXAMPLE 3

The effect of the compound of Example 1 is determined on chloroform-epinephrine induced arrhythmias in rats. In the procedure employed, the rats are anaesthetized with urethane. Chloroform is administered for one minute by inhalation and then 100 micrograms/kg. of epinephrine hydrochloride is administered intravenously. Electrocardiograms are taken and the extent of the arrhythmia in terms of number of beats per minute is determined.

The effect of the compound of Example 1 is substantially to reduce the extent of arrhythmia when administered interaperitoneally in the amount of 700 mg./kg.

EXAMPLE 4

N-(3,4,5-triethoxybenzoyl)-L-aspartic acid is prepared in accordance with the procedure of Example 1 except that 3,4,5-triethoxybenzoylchloride and L-aspartic acid are employed.

EXAMPLE 5

N-(3,4,5-tripropoxybenzoyl)-α-aminoadipic acid is prepared in accordance with the procedure of Example 1 except that 3,4,5-tripropoxybenzoylchloride and α-aminoadipic acid are employed.

EXAMPLE 6

N-(3,5-dimethoxy-4-ethoxybenzoyl) - α - aminopimelic acid is prepared in accordance with the procedure of Example 1 except that 3,5-dimethoxy-4-ethoxybenzoyl chloride and α-aminopimelic are employed.

EXAMPLE 7

N-(3,4,5-trimethoxybenzoyl) - α - aminosuberic acid is prepared in accordance with the procedure of Example 1 except that α-aminosuberic acid is employed.

EXAMPLE 8

A pharmaceutical composition in tablet form was prepared by mixing 500 mg. of the compound of Example 1 with 50 mg. of corn starch and 50 mg. of sucrose. This mixture was compressed in a tableting machine to make a durable tablet. It is suitable for oral administration to humans or other animals suffering from cardiac disorders. It is particularly suitable for prophylaxis of a suspected impending occlusion resulting in an infarction.

The above examples are representative. For example, the 3,4,5-trialkoxy benzoic acids are well known to the art. See, for example, U.S. Pats. 3,234,276; 3,364,249 and 3,485,865.

Suitable amino-dicarboxylic acids in addition to those of the examples include 4-amino-1, 9-nonane dioic acid
2-amino-1, 10-decane dioic acid.

EXAMPLE 9

Into a one liter flask equipped with an agitator and cooled in a salt bath is added 200 cc. of water and in the water is dissolved 40 grams of magnesium L-aspartate, purity 81% (0.2 mole), 8 grams of sodium hydroxide and 16 grams of sodium carbonate. To this solution is added dropwise with agitation in ½ hour at 0–5° C. a solution of 23 grams of 3,4,5-trimethoxybenzoyl chloride in 150 cc. of diethyl ether. This mixture is agitated one hour at about 0° C., then the ether layer and the water layer are separated, the water layer is diluted with more water, decolorized with charcoal and acidified with 10% HCl to a pH of 3.2. The product is filtered and washed with cold water. The crude product weighs 32 grams. It is crystallized from 300 cc. of ethanol using decolorizing carbon. Thus one obtains 20 grams of white crystalline product; M.P. 184–185° C. The product is N-(3,4,5-trimethoxybenzoyl)-L-aspartic acid having the structure

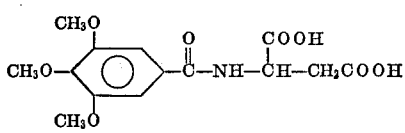

EXAMPLE 10

To a solution of 16 grams of sodium hydroxide in 200 cc. of water is added 16.1 grams of amino adipic acid. The solution is cooled to 5–10° and at that temperature is added a little at a time 23 grams of the chloride of 3,4,5-trimethoxy benzoic acid. The mixture is agitated 5 hours at room temperature and then acidified to the endpoint of Congo red with dilute hydrochloric acid. The product thus obtained is recrystallized from water to give a final product; M.P. 175–176° C. The product is N-(3,4,5-trimethoxybenzoyl)-alpha-aminoadipic acid having the structure

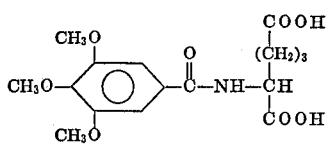

The dicarboxylic acid derivatives can be converted to the monoamide derivatives or the monoamide derivatives can be formed directly as in Examples 11 and 12. Similarly the lower alkyl monoestesr can be prepared, such as the methyl mono-ester derivative, the ethyl mono-ester derivative and the propyl mono-ester derivative. These monoamide and monoester derivatives are generally less water-soluble than the corresponding dicarboxylic acid derivatives.

EXAMPLE 11

In a 500 cc. flask equipped with an agitator and cooled in an ice bath is dissolved 14.6 grams (0.1 mole) of L-glutamine in a solution of 10 grams of sodium hydroxide in 100 cc. of water and then one adds a little at a time 22.5 grams of the chloride of 3,4,5-trimethoxy benzoic acid at 0–5° C. in about ½ hour, at the same time diluting the reaction mixture with 100 cc. of water. After standing overnight at room temperature the solution is decolorized with carbon and filtered. The filtrate is acidified with 10% hydrochloric acid to a pH of 3.2. The precipitate thus formed is filtered and washed with a little cold water. It is then recrystallized from a mixture of ethanol and petroleum ether to give 8.5 grams of white crystalline product, M.P. about 170° C. The product is N - (3,4,5 - trimethoxybenzoyl)-L-glutamine having the structure

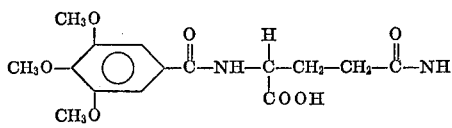

EXAMPLE 12

In a 500 cc. flask equipped with an agitator and containing a solution of 10 grams of sodium hydroxide in 100 cc. of water is dissolved 15 grams (0.1 mole) of L-asparagine monohydrate. Then 22.5 grams of the chloride of 3,4,5-trimethoxy benzoic acid is added slowly maintaining the temperature at 5–10°. During this addition 100 cc. more of water is also added. After one night at room temperature the solution is decolorized with active charcoal and filtered. It is then acidified with 10% hydrochloric acid to the end-point of Congo red. This is 24 grams of crude product. This is recrystallized from a mixture of 500 cc. of water and 100 cc. of ethanol. After a second recrystallization from aqueous ethanol 9 grams of product are obtained; M.P. 198–200° C. The product is N-(3,4,5-trimethoxybenzoyl)-L-asparagine having the structure

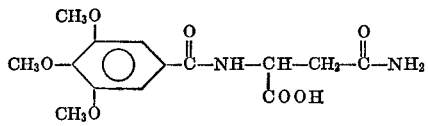

The recommended dosage during the first 24 hours following infarction is as follows:

2–4 grams by phleboclysis; 1–2 ampoules (each ampoule containing 2,000 mg. of the sodium salt of the compound of Example 1 dissolved in sufficient sterilized distilled water to make 10 cc.) dissolved in 400–600 cc. of saline solution.

2–4 grams by intravenous administration; 2–4 ampoules divided into 2–4 administrations (each ampoule containing 1,000 mg. of the sodium salt of the compound of Example 1 dissolved in sufficient sterilized distilled water to make 10 cc.).

2 grams by intramuscular administration; 8 ampoules divided into 4 administrations (each ampoule containing 250 mg. of the sodium salt of the compound of Example 1 and sufficient sterilized distilled water to make 3 cc.).

4–6 grams by oral administration; 8–12 tablets (each tablet containing 500 mg. of the sodium salt of the compound of Example 1 and sufficient excipient to make one tablet).

4–6 grams by oral administration; 8–12 ampoules (each ampoule containing one or two grams of the sodium salt of the compound of Example 1 in sufficient sterilized distilled water to make 10 cc.).

In the third or fourth day after start of therapy, the dosage can be reduced to half the above amounts. The therapy should not be interrupted before the third week after heart infarction has occurred.

Both in the attack phase and in the maintenance stage the therapy can be carried out using one or more of the different forms of administration.

What is claimed is:

1. A compound represented by the formula

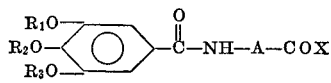

wherein each of $R_1$, $R_2$ and $R_3$ is methyl, ethyl or propyl, A is a saturated aliphatic hydrocarbon radical containing 2–8 carbon atoms substituted with one carboxylic acid group, and X is —OH, —NH$_2$ or —OR$_4$ where R$_4$ is lower alkyl and pharmaceutically acceptable salts thereof.

2. The compound of claim 1 where $R_1$, $R_2$ and $R_3$ are methyl, X is —OH, and A is

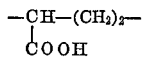

3. The compound of claim 1 where $R_1$, $R_2$ and $R_3$ are methyl, X is —OH, and A is

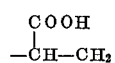

4. The compound of claim 1 where $R_1$, $R_2$ and $R_3$ are methyl, X is —OH and A is

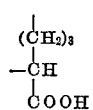

5. The compound of claim 1 where $R_1$, $R_2$ and $R_3$ are methyl, X is —NH$_2$ and A is

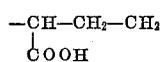

6. The compound of claim 1 where $R_1$, $R_2$ and $R_3$ are methyl, X is —$NH_2$ and A is

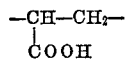

7. A compound of claim 1 in which the pharmaceutically acceptable salts are the sodium or potassium salts.

8. A compound represented by the formula

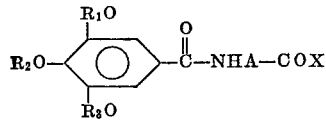

wherein each of $R_1$, $R_2$ and $R_3$ is methyl, ethyl or propyl, A is a saturated aliphatic hydrocarbon radical containing 2–8 carbon atoms substituted with one carboxylic acid group, and X is —OH or —$NH_2$.

References Cited

UNITED STATES PATENTS 3,489,793   1/1970   Bertelli _____ 260—519

LORRAINE A. WEINBERGER, Primary Examiner

L. THAXTON, Assistant Examiner

U.S. Cl. X.R.

260—471 A; 424—309, 319